United States Patent
Noda (10) Patent No.: US 10,401,719 B2
(45) Date of Patent: Sep. 3, 2019

(54) LIGHT SOURCE APPARATUS AND PROJECTION-TYPE DISPLAY APPARATUS

(71) Applicant: CANON KABUSHIKI KAISHA, Tokyo (JP)

(72) Inventor: Toshiyuki Noda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/847,664

(22) Filed: Dec. 19, 2017

(65) Prior Publication Data

US 2018/0173086 A1   Jun. 21, 2018

(30) Foreign Application Priority Data

Dec. 21, 2016 (JP) ................. 2016-247786

(51) Int. Cl.
| F21V 33/00 | (2006.01) |
| G03B 21/20 | (2006.01) |
| G02B 26/00 | (2006.01) |
| G03B 21/16 | (2006.01) |

(52) U.S. Cl.
CPC ......... *G03B 21/204* (2013.01); *G02B 26/008* (2013.01); *G03B 21/16* (2013.01); *G03B 21/2066* (2013.01)

(58) Field of Classification Search
CPC ........... F21Y 2101/02; F21V 9/16; F21K 9/00

USPC .......................................... 362/84
See application file for complete search history.

(56) References Cited

U.S. PATENT DOCUMENTS

| 2015/0226389 A1* | 8/2015 | Kasugai | G02B 26/008 353/31 |
| 2016/0150200 A1* | 5/2016 | Saka | G03B 21/005 353/31 |
| 2017/0269464 A1* | 9/2017 | Tsai | G03B 21/204 |
| 2018/0031957 A1* | 2/2018 | Egawa | G02B 26/008 |

FOREIGN PATENT DOCUMENTS

| JP | 10-154889 A | 6/1998 |
| JP | 2012-013897 A | 1/2012 |
| JP | 2014-146056 A | 8/2014 |
| JP | 2015-179687 A | 10/2015 |

* cited by examiner

*Primary Examiner* — Ahshik Kim
(74) *Attorney, Agent, or Firm* — Canon U.S.A., Inc. IP Division

(57) ABSTRACT

A light source apparatus includes a light source, a disk held to be rotatable about a rotation axis, a wavelength conversion member arranged on the disk and configured to convert a wavelength of light from the light source, and a storage member configured to store the disk, wherein, inside of the storage member, a plurality of circumferential wall portions centering on the rotation axis is arranged integrally with the storage member.

18 Claims, 10 Drawing Sheets

LIGHT SOURCE APPARATUS AND PROJECTION-TYPE DISPLAY APPARATUS

BACKGROUND OF THE INVENTION

Field of the Invention

The present disclosure relates to a light source apparatus using fluorescence light acquired by exciting a phosphor with excitation light.

Description of the Related Art

A light source apparatus including a laser light source has recently been proposed from high durability and high brightness standpoints. Such a light source apparatus condenses light emitted from the laser light source to a phosphor wheel including a phosphor layer for converting a wavelength. Moreover, the light source apparatus with the phosphor wheel needs to rotate the phosphor wheel by using a motor to prevent degradation in wavelength conversion efficiency and deterioration of a binder (a resin material) due to a local increase in temperature of the phosphor layer.

In a case where a foreign substance such as dust adheres to a surface of the phosphor layer, an amount of light reaching the phosphor layer is decreased. This degrades wavelength conversion efficiency. Accordingly, the phosphor wheel needs to be stored in a sealed space. However, if the phosphor wheel is stored in the sealed space, an increase in temperature of the phosphor wheel is not easily prevented.

Japanese Patent Application Laid-Open No. 2014-146056 discuses a light source apparatus in which a phosphor wheel includes a blade portion to facilitate airflow inside a sealed space in a casing. With such a configuration, the light source apparatus radiates heat generated by the phosphor wheel inside the casing to the outside.

Although the configuration discussed in Japanese Patent Application Laid-Open No. 2014-146056 enables heat generated by the phosphor wheel to be radiated outside the casing, a load of a motor for rotating the phosphor wheel is increased. Consequently, noise is increased.

SUMMARY OF THE INVENTION

According to an aspect of the present disclosure, a light source apparatus includes a light source, a disk held to be rotatable about a rotation axis, a wavelength conversion member arranged on the disk and configured to convert a wavelength of light from the light source, and a storage member configured to store the disk, wherein, inside of the storage member, a plurality of circumferential wall portions centering on the rotation axis is arranged integrally with the storage member.

According to another aspect of the present disclosure, a light source apparatus includes a light source, a disk held to be rotatable about a rotation axis, a wavelength conversion member arranged on the disk and configured to convert a wavelength of light from the light source, and a storage member configured to store the disk, wherein, inside of the storage member, a spiral wall portion with reference to the rotation axis is arranged integrally with the storage member.

According to yet another aspect of the present disclosure, a projection-type display apparatus includes a light source apparatus and an optical system that modulates light emitted from the light source apparatus and projects the modulated light.

Other aspects and features of the present disclosure are described in exemplary embodiments below.

Further features of the present disclosure will become apparent from the following description of exemplary embodiments with reference to the attached drawings.

DESCRIPTION OF THE EMBODIMENTS

Exemplary embodiments of the present disclosure are described below in detail with reference to the drawings.

(Overall Configuration of Projection-Type Display Apparatus)

Figure 8:
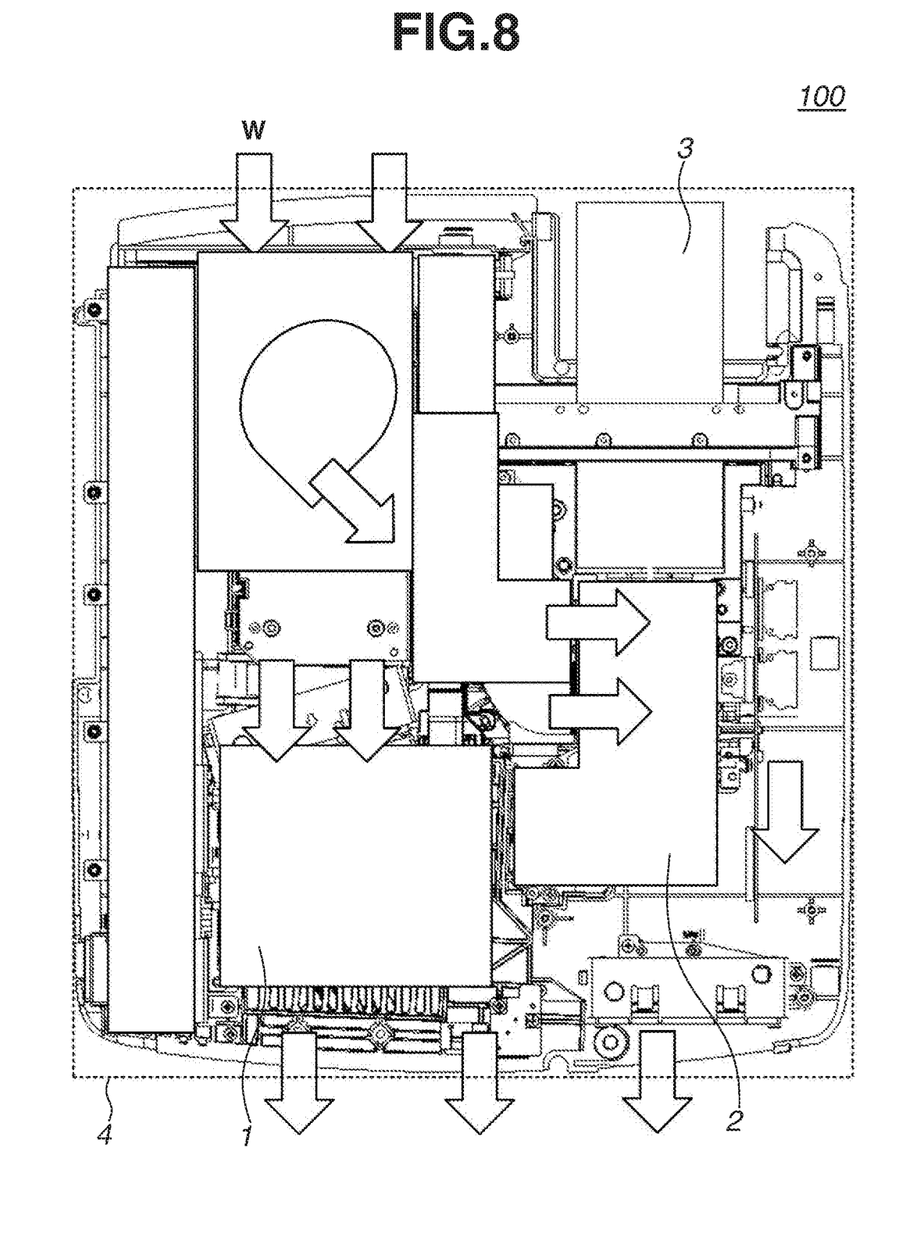
FIG. 8 is a diagram illustrating an overall configuration of a projection-type display apparatus according to each of the exemplary embodiments.

First, a configuration of a projection-type display apparatus 100 according to a first exemplary embodiment of the present disclosure is described. FIG. 8 is a diagram illustrating an overall configuration of the projection-type display apparatus 100 according to the present exemplary embodiment. Referring to FIG. 8, the projection-type display apparatus 100 includes a light source apparatus 1, an optical system (an illumination optical system and a color separation/combination optical system) 2, a projection lens 3, and an exterior case (a casing) 4. The optical system 2 adds image information to light from the light source apparatus 1. The projection lens 3 projects light (an image) from the optical system 2 on a screen (a projection target surface). The exterior case 4 houses these elements. The optical system 2 and the projection lens 3 that can be held by the exterior case 4 constitutes an optical system that modulates light emitted from the light source apparatus 1 and projects the modulated light. In FIG. 8, arrows W indicate airflow inside the projection-type display apparatus 100.

(Configuration of Light Source Unit)

Figure 1:
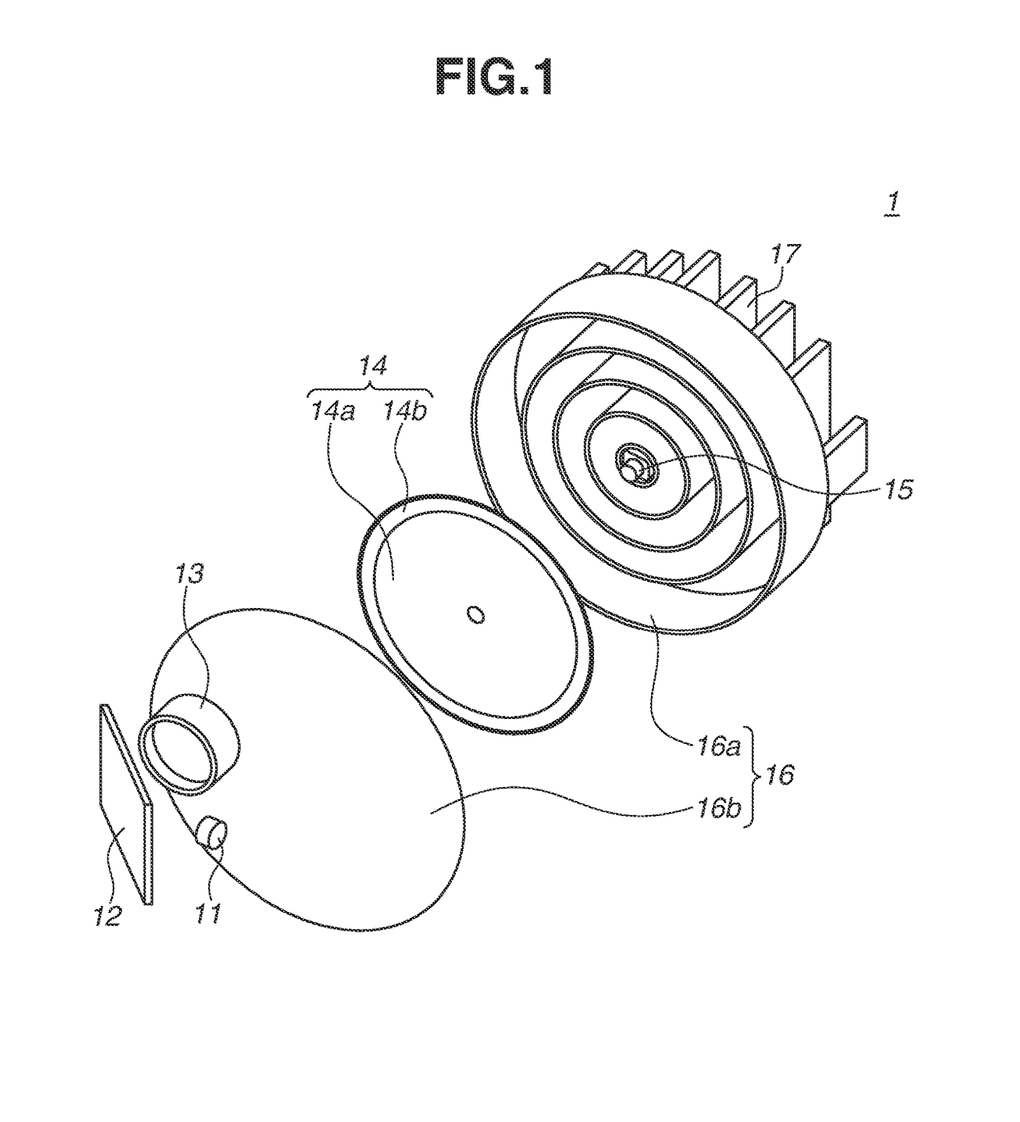
FIG. 1 is an exploded perspective view illustrating a light source apparatus according to a first exemplary embodiment.
Figure 2:
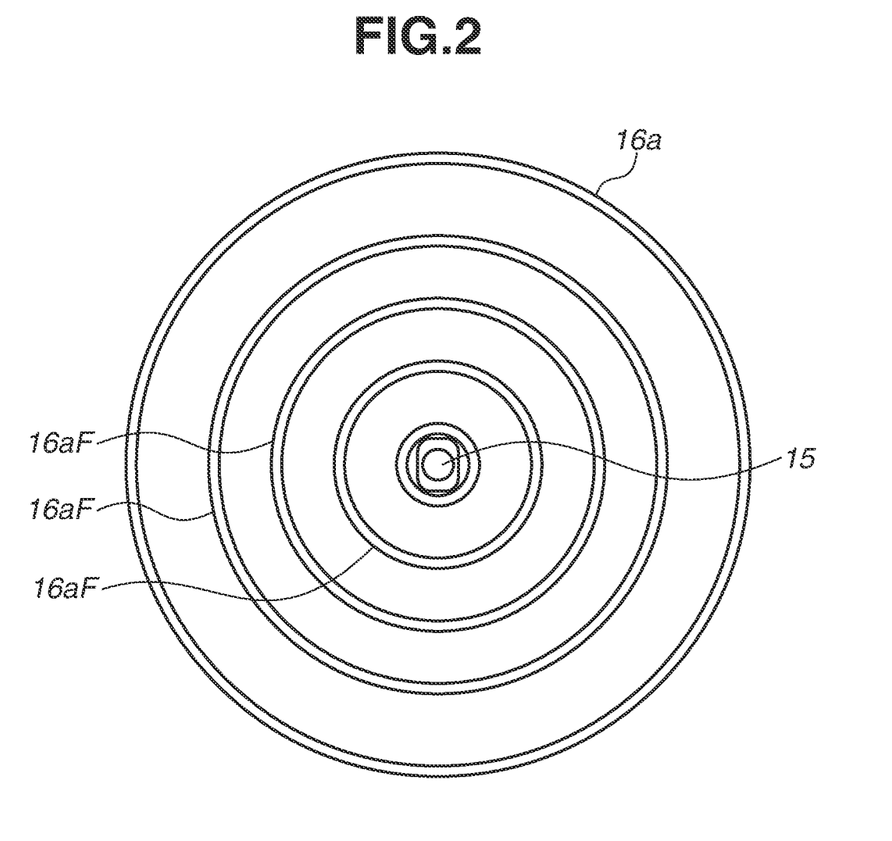
FIG. 2 is a plan view illustrating a case of the light source apparatus according to the first exemplary embodiment.
Figure 3:
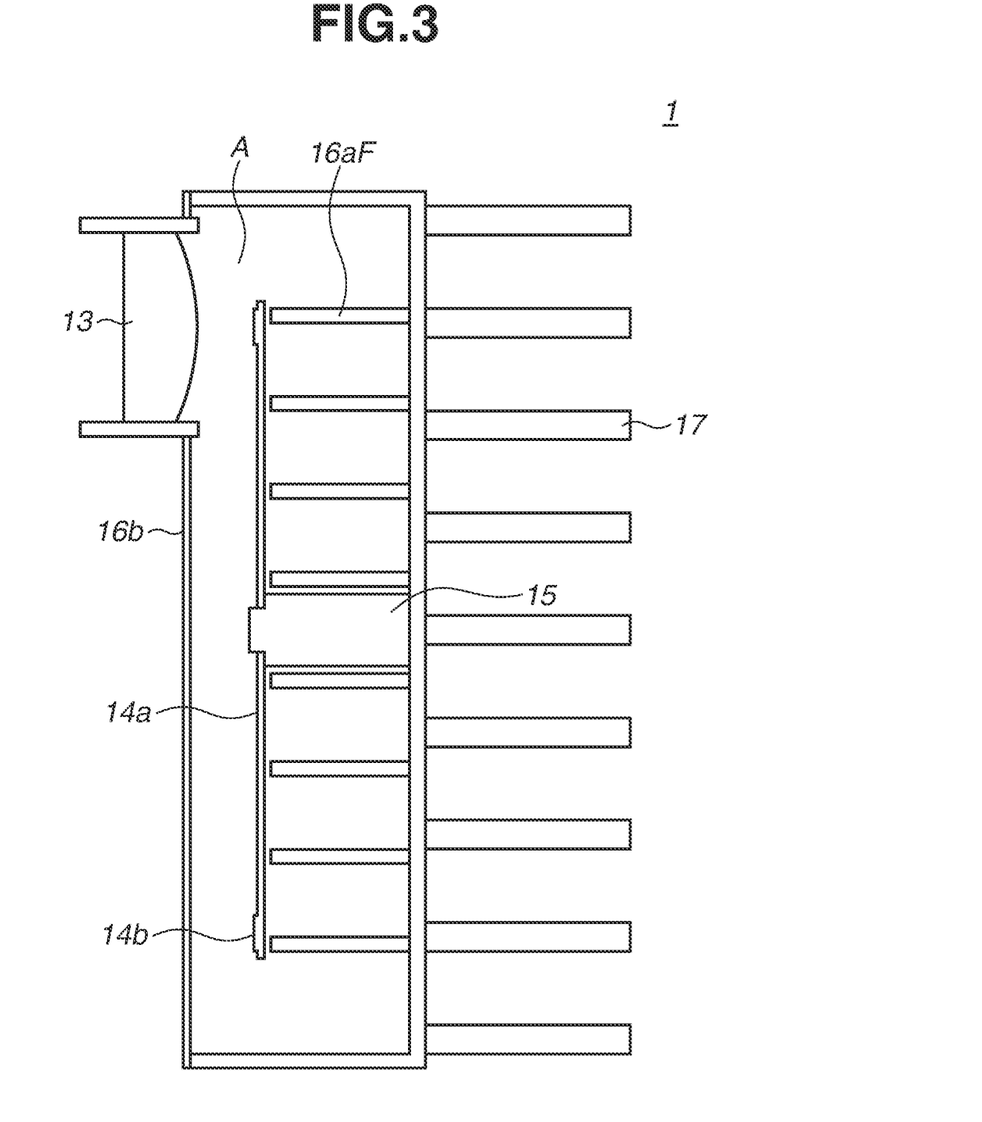
FIG. 3 is a sectional view illustrating the light source apparatus according to the first exemplary embodiment.
Figure 4:
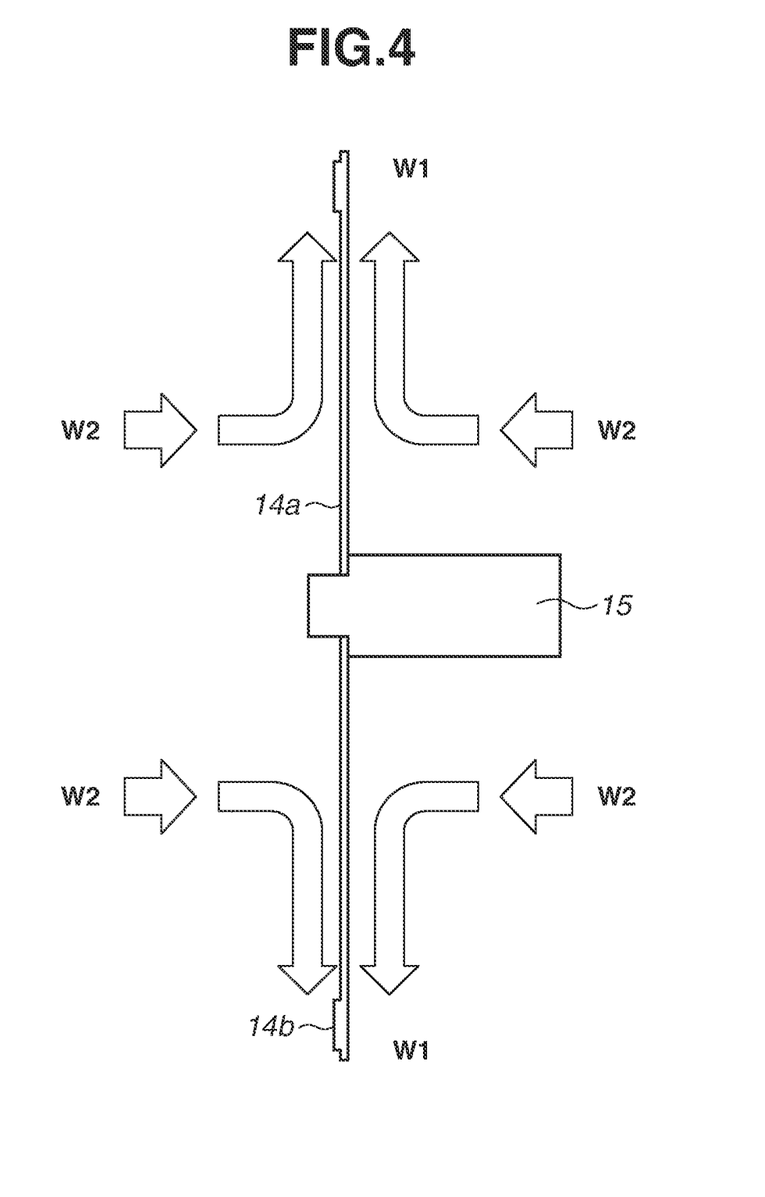
FIG. 4 is a schematic diagram illustrating airflow generated by rotation of the phosphor wheel according to the first exemplary embodiment.

Next, a configuration of the light source apparatus 1 is described with reference to FIGS. 1 through 4. FIG. 1 is an exploded perspective view of the light source apparatus 1. FIG. 2 is a plan view of a case 16a. FIG. 3 is a sectional view of the light source apparatus 1. FIG. 4 is a schematic diagram illustrating airflow generated by rotation of a phosphor wheel 14.

A light source (solid-state light source) 11 irradiates a phosphor layer 14b with light. The phosphor layer 14b is described below. A dichroic mirror 12 reflects light emitted from the light source 11, and transmits light with a wavelength that is converted as described below. Moreover, the light source apparatus 1 includes a condenser optical system 13. The phosphor wheel 14 includes a disk 14a and the phosphor layer 14b annularly applied on the disk 14a. The phosphor layer 14b is arranged on the disk 14a, and serves as a wavelength conversion member for converting a wavelength of light (incident light) from the light source 11. A motor 15 rotates the phosphor wheel 14. The motor 15 includes a rotation axis that is fixed so as to coincide with the center of the phosphor wheel 14. A casing 16 includes the case 16a and a cover 16b to house the phosphor wheel 14. In the present exemplary embodiment, the casing 16 (the case 16a, the cover 16b) and the condenser optical system 13 form a storage member for storing the disk 14a.

The light source 11 includes a plurality of semiconductor laser diodes that are arrayed. The plurality of semiconductor laser diodes emits excitation light (laser beam). However, a configuration of the light source 11 is not limited thereto. For example, the light source 11 may include a plurality of light emitting diodes (LEDs) that are arrayed. The light emitted from the light source 11 is condensed to the phosphor layer 14b via the condenser optical system 13.

The disk 14a of the phosphor wheel 14 is made of a material having high heat conductivity such as aluminum and copper, and is connected to the motor 15, which rotates the phosphor wheel 14, in the rotation center of the disk 14a. Moreover, the disk 14a is held to be rotatable around a rotation axis of the motor 15. In other words, the center of the phosphor wheel 14 and the rotation axis (rotation center) of the motor 15 coincide with each other, so that the motor 15 can rotate about an axis of the phosphor wheel 14. The motor 15 is held by the case 16a.

With such a configuration, the light emitted from the light source 11 is condensed to the phosphor layer 14b, and one portion of such light is absorbed by a phosphor. The phosphor with the absorbed light is excited to function as a wavelength conversion member for emitting fluorescence light. As a result, light energy is concentrated in a small area of the phosphor layer 14b, and temperature of the phosphor layer 14b becomes high. Accordingly, the use of the high heat conductive member as the disk 14a on which the phosphor layer 14b is applied radiates heat of the phosphor layer 14b to the disk 14a, thereby lowering the temperature of the phosphor layer 14b. Further, the motor rotates the phosphor wheel 14 as described above, so that a region irradiated with light is constantly moved on the phosphor layer 14b. Such a configuration prevents (reduces) a local increase in temperature (high temperature) of the phosphor layer 14b. Moreover, the rotation of the phosphor wheel 14 provides air contacting a surface of the phosphor layer 14b with a flow, so that a cooling effect can be further obtained.

In the present exemplary embodiment, as illustrated in FIG. 3, the casing 16 including the case 16a and the cover 16b is arranged so as to house the phosphor wheel 14, and a sealed space A blocked from external air is formed. As a result, adhesion of a foreign substance to the phosphor layer 14b due to intrusion of the foreign substance from the outside can be prevented. On the other hand, heat inside the sealed space A needs to be radiated outside via the casing 16 to cool the phosphor layer 14b.

When the phosphor wheel 14 is rotated, the air in contact with the phosphor wheel 14 is sent in an all-circumferential direction (indicated by arrows W1) by a centrifugal force generated by the rotation, as illustrated in FIG. 4. Such action causes both sides of the phosphor wheel 14 to have negative pressure, and airflows (in directions indicated by arrows W2) is generated in such a manner that air around the both sides of the phosphor wheel 14 is drawn toward the phosphor wheel 14.

In the present exemplary embodiment, as illustrated in FIGS. 1 to 3, a plurality of circumferential (annular) wall portions 16aF (protruding portions, fins inside the case 16a) centering on the rotation axis of the motor 15 (the rotation center of the phosphor wheel 14) is arranged on an inner surface of the case 16a (integrally with the case 16a). In the present exemplary embodiment, each of the plurality of wall portions 16aF is arranged across 360 degrees (across the entire circumference) around the rotation axis of the motor 15. The plurality of wall portions 16aF functions as fins that increase contact areas between the wall portions 16aF and the air inside the sealed space A to transfer heat inside the sealed space A to the casing 16. Thus, the wall portions 16aF are preferably arranged in the vicinity (proximity arrangement) of the phosphor wheel 14 to facilitate transfer of hear inside the sealed space A.

Figure 9:
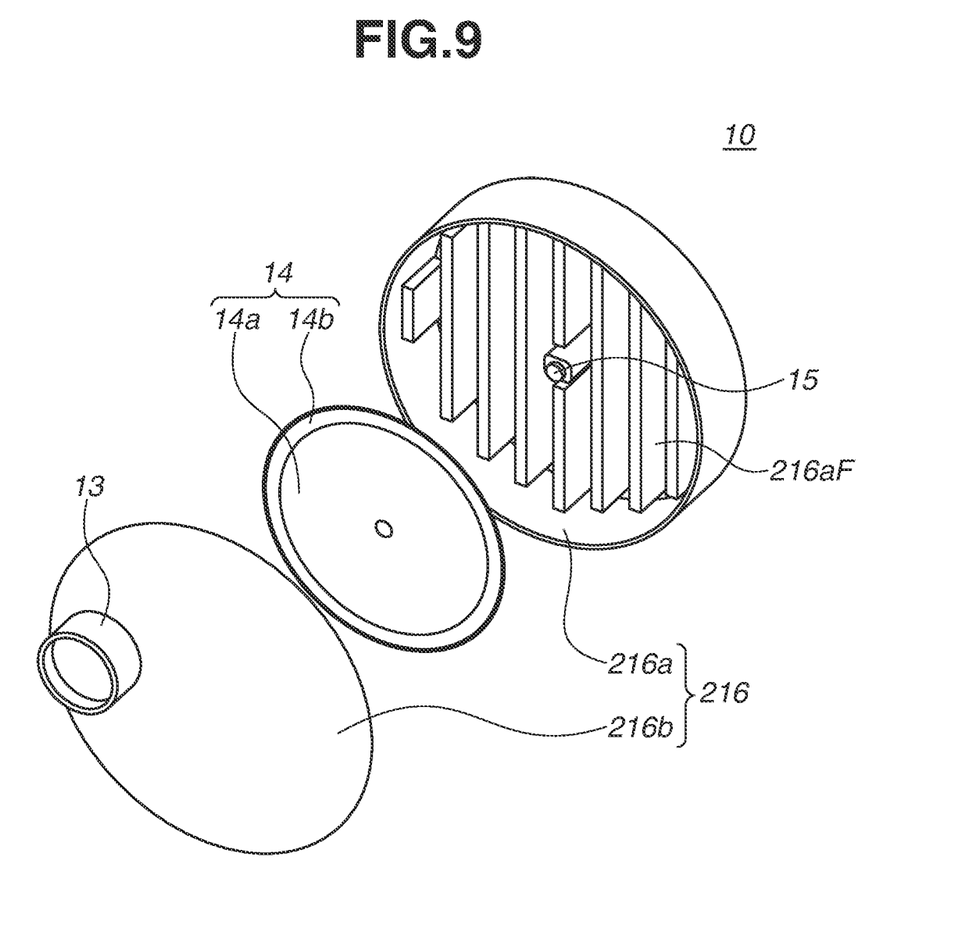
FIG. 9 is an exploded perspective view illustrating a light source apparatus as a comparative example.
Figure 10:
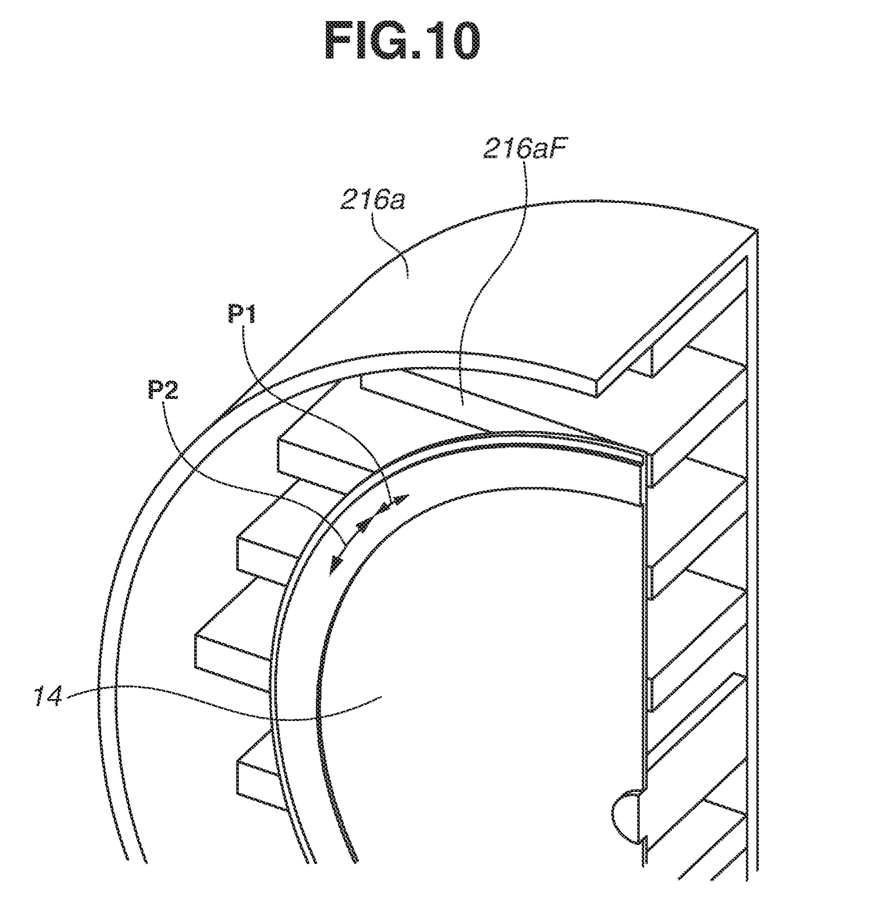
FIG. 10 is an enlarged view illustrating a main portion of the light source apparatus as the comparative example.

Herein, a light source apparatus 10 as a comparative example is described with reference to FIGS. 9 and 10. FIG. 9 is an exploded perspective view of the light source apparatus 10 as the comparative example. FIG. 10 is an enlarged view of a main portion of the light source apparatus 10 as the comparative example. As illustrated in FIGS. 9 and 10, the light source apparatus 10 includes a casing 216 (a case 216a) in which a linear fin 216aF is arranged. In a case where such a linear fin 216aF is arranged, temporal pressure fluctuation occurs with rotation of a phosphor wheel 14. More specifically, as illustrated in FIG. 10, when an optional point of the rotating phosphor wheel 14 passes a position (P1) in the vicinity of a tip of a linear fin 216aF, pressure increases, while when the optional point of the rotating phosphor wheel 14 passes a position (P2) between an adjacent linear fin 216aF, pressure is brought back (decreases). Such a phenomenon causes noise due to a rotation cycle of the phosphor wheel 14.

Accordingly, in the present exemplary embodiment, as illustrated in FIGS. 1 and 2, the plurality of circumferential wall portions 16aF centering on the rotation axis (the rotation center of the phosphor wheel 14) is formed on an inner surface of the case 16a. Such a configuration enables heat around the phosphor wheel 14 to be efficiently transferred to the casing 16. Moreover, such a configuration can reduce pressure fluctuation on a surface of the phosphor wheel 14, and thus generation of noise caused by rotation of the phosphor wheel 14 can be reduced.

Figure 5:
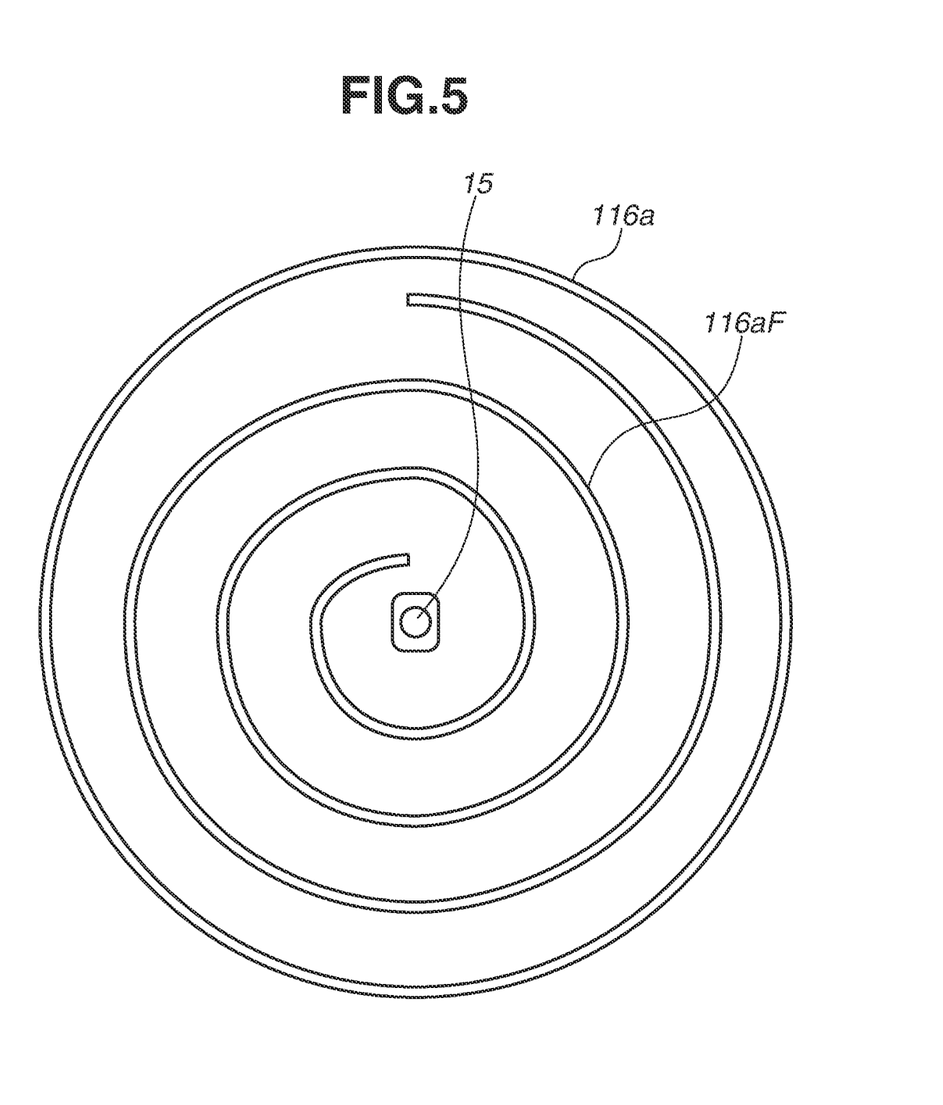
FIG. 5 is a plan view illustrating a case as a modification example of the first exemplary embodiment.

In the present exemplary embodiment, the case 16a includes a plurality of circumferential (annular) wall portions 16aF (protruding portions) around a rotation axis of the motor (the rotation center of the phosphor wheel 14). However, the present exemplary embodiment is not limited thereto. FIG. 5 is a plan view of a case 116a as a modification example of the present exemplary embodiment. Even if the case 116a including a spiral wall portion 116aF (a protruding portion, a fin inside the case 116a) with reference to a rotation axis of a motor 15 (the rotation center of a phosphor wheel 14) is used instead of the case 16a, the effect of the present exemplary embodiment can be obtained. The phrase "with reference to a rotation axis of a motor 15" represents, for example, a configuration in which a starting position of the spiral wall portion 116aF passes the rotation axis of the motor 15 if the spiral wall portion 116aF is extended.

The term "spiral" used herein represents a shape along a two-dimensional curve revolved away from the center (the rotation axis of the motor 15). On the other hand, the term "spiral" represents a shape along a three-dimensional curve that is not only revolved away from the center (the rotation axis of the motor 15), but also moved in a direction perpendicular to a revolving surface (a sheet surface in FIG. 5). If the wall portion 16aF has a shape along Archimedes spiral that is expressed by a polar coordinate function of r=a+bθ, or a shape along logarithmic spiral that is expressed by r=a*b^θ, a position of θ=0 and the rotation axis of the motor 15 can coincide with each other. The wall portion 16aF (or the wall portion 116aF) is preferably made of metal having high heat conductivity. With such a configuration, heat inside the sealed space A can be transferred more efficiently to the casing 16, and temperature of the phosphor layer 14b can be further reduced.

Preferably, a heat radiation fin 17 is arranged on an outer surface of the casing 16 (the case 16a) as illustrated in FIGS. 1 and 3. According to such a configuration, a heat radiation area of the casing 16 is increased, so that efficiency of heat radiation from the casing 16 to the outside can be enhanced, and temperature of the phosphor layer 14b can be further reduced. More preferably, a cooling fan (not illustrated) for moving air around a fin F on an outer surface of the casing 16 is arranged. Such an arrangement can enhance cooling efficiency.

The present exemplary embodiment has been described using a configuration for reflecting light emitted from the light source 11. However, the present exemplary embodiment is not limited thereto. The present exemplary embodiment can be applied to, for example, a configuration in which a light transmission member (e.g., glass, crystal, and sapphire) is used as the disk 14a to transmit light emitted from the light source 11.

Figure 6:
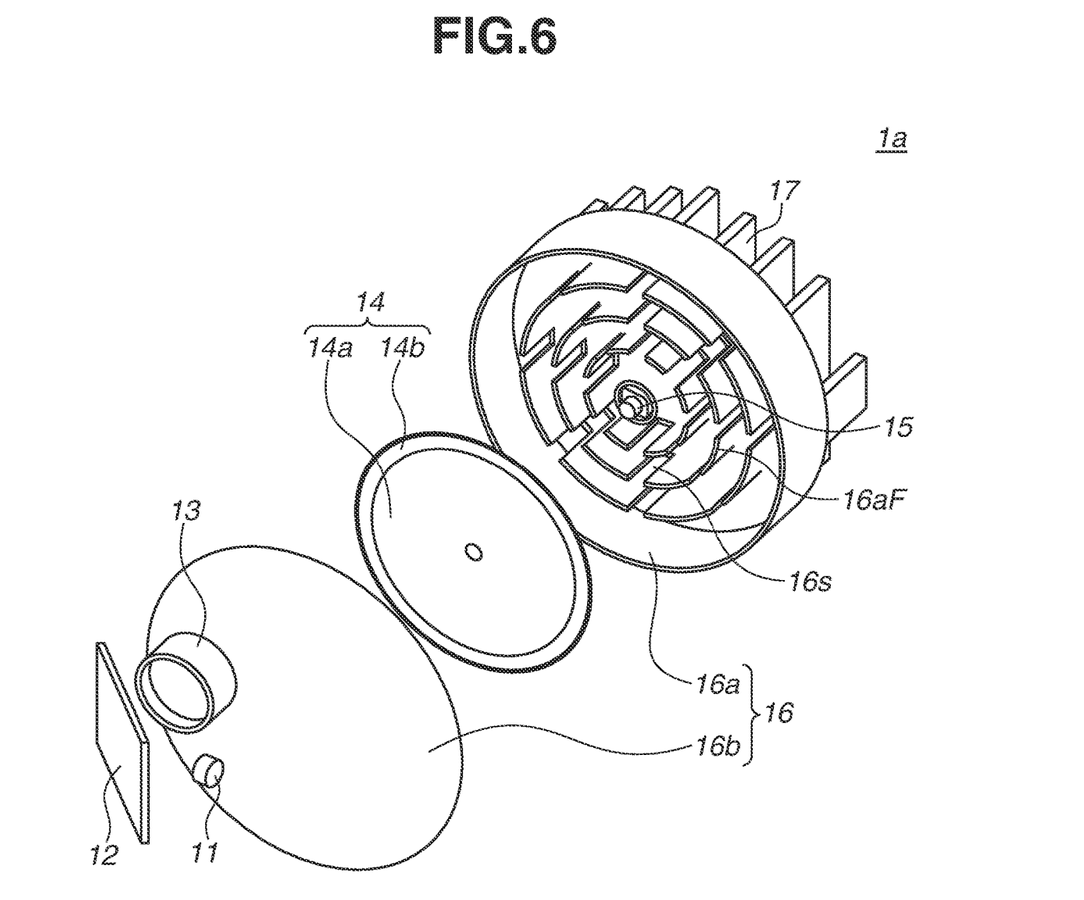
FIG. 6 is an exploded perspective view illustrating a light source apparatus according to a second exemplary embodiment.
Figure 7:
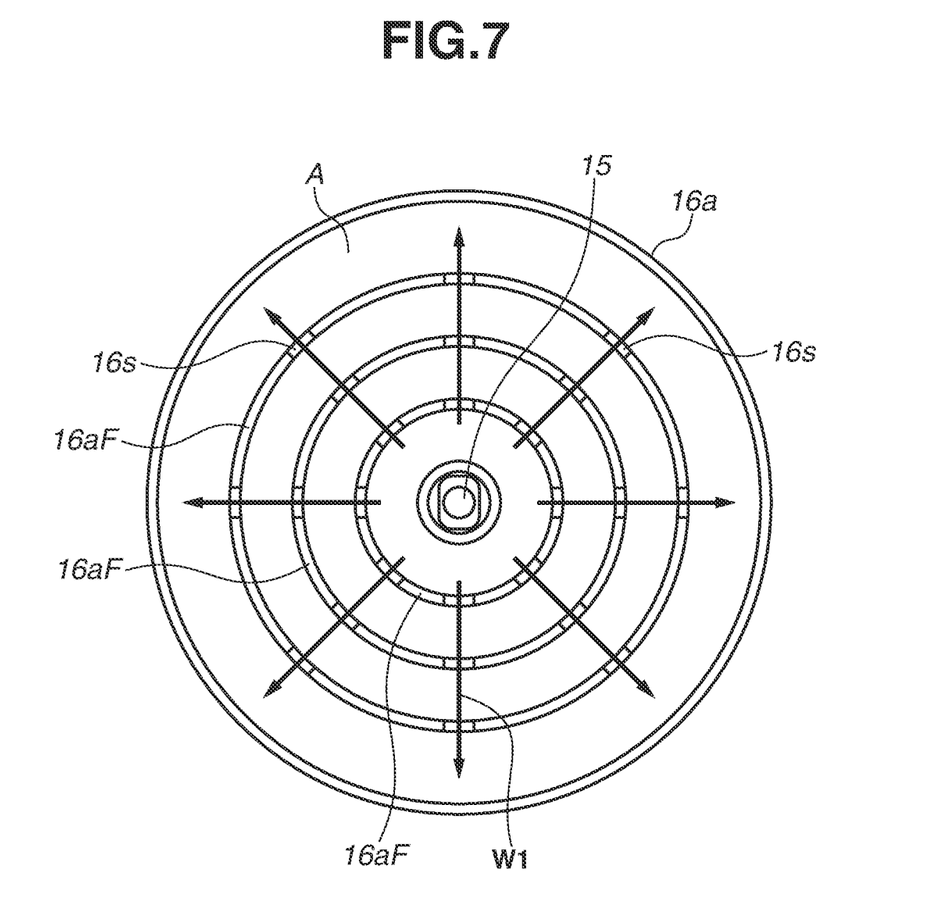
FIG. 7 is a plan view illustrating a case of the light source apparatus according to the second exemplary embodiment.

Next, a light source apparatus 1a according to a second exemplary embodiment of the present disclosure is described with reference to FIGS. 6 and 7. FIG. 6 is an exploded perspective view illustrating the light source apparatus 1a. FIG. 7 is a plan view illustrating a case of the light source apparatus 1a.

In the first exemplary embodiment, a description has been given of the circumferential wall portions 16aF (or the spiral wall portion 116aF) arranged across the entire circumference of the rotation axis of the motor 15. As described with reference to FIG. 4, a rotating phosphor wheel 14 has a characteristic in which radial airflow is generated in a circumferential direction. In consideration of the characteristic, in the present exemplary embodiment, slits 16s (gaps) are provided on a wall portion 16aF radially from the rotation center, as illustrated in FIGS. 6 and 7. With such a configuration, air circulation inside a casing 16 (a sealed space A) can be facilitated without interrupting flow of airflow (indicated by arrows W1 in FIG. 7) generated by rotation of the phosphor wheel 14 flowing around the wall portions 16aF.

As described above, in the present exemplary embodiment, each of the plurality of wall portions 116aF includes the gaps (the slits 16s) at some phases (positions) around the rotation axis of the motor 15. Preferably, each of the plurality of wall portions 116aF includes the slits 16s at predetermined phases along radiation directions from the rotation axis of the motor 15 as the some phases. However, the plurality of wall portions 116aF may include the slits 16s at different phases from one another. Further, it is not necessary that all of the plurality of wall portions 116aF include the slits 16s, and at least one of the plurality of wall portions 116aF may include the slits 16s.

Such a configuration prevents pressure fluctuation in an optional point of the phosphor wheel 14, and enables heat of the phosphor layer 14b to be efficiently transferred (radiated) to a casing 16 while suppressing generation of noise. In a case where a protruding portion is formed in a spiral shape instead of an annular shape, a similar effect can be obtained by the slit.

Consequently, each of the exemplary embodiments can provide a light source apparatus capable of efficiently radiating heat generated by a phosphor wheel to the outside of a casing while preventing an increase in a load of a motor for rotating the phosphor wheel 14, and can provide a projection-type display apparatus including such a light source apparatus.

Exemplary embodiments of the present disclosure have been described above. However, the present disclosure is not limited thereto. Various modifications and enhancements are possible without departing from scope of the disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-247786, filed Dec. 21, 2016, which is hereby incorporated by reference herein in its entirety.

What is claimed is:

1. A light source apparatus comprising:
a light source;
a disk held to be rotatable about a rotation axis;
a wavelength conversion member arranged on the disk and configured to convert a wavelength of light from the light source; and
a storage member configured to store the disk,
wherein, inside of the storage member, a plurality of circumferential wall portions centering on the rotation axis is arranged so as to be connected to the storage member thermally, and
wherein the plurality of circumferential wall portions is fixed to the storage member storing the disk.

2. A light source apparatus comprising:
a light source;
a disk held to be rotatable about a rotation axis;
a wavelength conversion member arranged on the disk and configured to convert a wavelength of light from the light source; and
a storage member configured to store the disk,
wherein, inside of the storage member, a spiral wall portion with reference to the rotation axis is arranged so as to be connected to the storage member, and
wherein the spiral wall portion is fixed to the storage member storing the disk.

3. The light source apparatus according to claim 1, wherein the wall portions are arranged across 360 degrees around the rotation axis.

4. The light source apparatus according to claim 1, wherein the wall portions include a gap around the rotation axis.

5. The light source apparatus according to claim 4, wherein the wall portions include the gap at a predetermined phase along a radiation direction from the rotation axis.

6. The light source apparatus according to claim 1, wherein the wall portions are made of metal.

7. The light source apparatus according to claim 1, further comprising a heat radiation fin arranged on an outer surface of the storage member.

8. The light source apparatus according to claim 2, wherein the wall portion is arranged across 360 degrees around the rotation axis.

9. The light source apparatus according to claim 2, wherein the wall portion includes a gap at a phase around the rotation axis.

10. The light source apparatus according to claim 9, wherein the wall portion includes the gap at a predetermined phase along a radiation direction from the rotation axis as the phase.

11. The light source apparatus according to claim 2, wherein the wall portion is made of metal.

12. The light source apparatus according to claim 2, further comprising a heat radiation fin arranged on an outer surface of the storage member.

13. A projection typo display apparatus comprising:
a light source apparatus; and
a casing capable of holding an optical system that modulates light emitted from the light source apparatus and projects the modulated light,
wherein the light source apparatus includes:
a light source;
a disk held to be rotatable about a rotation axis;
a wavelength conversion member arranged on the disk and configured to convert a wavelength of light from the light source; and
a storage member configured to store the disk, and
wherein, inside of the storage member, a plurality of circumferential wall portions centering on the rotation axis is arranged so as to be connected to the storage member thermally, and
wherein the plurality of circumferential wall portions is fixed to the storage member storing the disk.

14. A projection typo display apparatus comprising:
a light source apparatus; and
a casing capable of holding an optical system that modulates light emitted from the light source apparatus and projects the modulated light,
wherein the light source apparatus includes:
a light source;
a disk held to be rotatable about a rotation axis;
a wavelength conversion member arranged on the disk and configured to convert a wavelength of light from the light source; and
a storage member configured to store the disk,
wherein, inside of the storage member, a spiral wall portion with reference to the rotation axis is arranged so as to be connected to the storage member, and
wherein the spiral wall portion is fixed to the storage member storing the disk.

15. A light source apparatus comprising:
a light source;
a disk held to be rotatable about a rotation axis;
a wavelength conversion member arranged on the disk and configured to convert a wavelength of light from the light source; and
a storage member configured to store the disk,
wherein, inside of the storage member, a plurality of circumferential wall portions centering on the rotation axis is arranged so as to be connected to the storage member thermally, and
wherein the wall portions include a gap around the rotation axis.

16. A light source apparatus comprising:
a light source;
a disk held to be rotatable about a rotation axis;
a wavelength conversion member arranged on the disk and configured to convert a wavelength of light from the light source;
a storage member configured to store the disk,
wherein, inside of the storage member, a plurality of circumferential wall portions centering on the rotation axis is arranged so as to be connected to the storage member thermally; and
a heat radiation fin arranged on an outer surface of the storage member.

17. A light source apparatus comprising:
a light source;
a disk held to be rotatable about a rotation axis;
a wavelength conversion member arranged on the disk and configured to convert a wavelength of light from the light source; and
a storage member configured to store the disk,
wherein, inside of the storage member, a spiral wall portion with reference to the rotation axis is arranged so as to connected to the storage member, and
wherein the wall portion includes a gap around the rotation axis.

18. A light source apparatus comprising:
a light source;
a disk held to be rotatable about a rotation axis;
a wavelength conversion member arranged on the disk and configured to convert a wavelength of light from the light source;
a storage member configured to store the disk,
wherein, inside of the storage member, a spiral wall portion with reference to the rotation axis is arranged so as to connected to the storage member; and
a heat radiation fin arranged on an outer surface of the storage member.

* * * * *